United States Patent [19]

Inoue et al.

[11] 4,047,211
[45] Sept. 6, 1977

[54] MECHANICAL EXPOSURE CONTROL MEANS FOR ELECTRIC SHUTTERS

[75] Inventors: Nobuyoshi Inoue; Munetaka Shimizu, both of Kawagoe, Japan

[73] Assignee: Copal Company Limited, Japan

[21] Appl. No.: 617,165

[22] Filed: Sept. 26, 1975

[30] Foreign Application Priority Data

Sept. 28, 1974  Japan .............. 49-116348[U]

[51] Int. Cl.² ............................................. G03B 9/58
[52] U.S. Cl. .................................. 354/258; 354/137; 354/238; 354/256; 354/266
[58] Field of Search ............... 354/50, 51, 60 R, 60 F, 354/137, 234, 235, 238, 256, 258, 259, 260, 266, 267

[56] References Cited

U.S. PATENT DOCUMENTS

| | | | |
|---|---|---|---|
| 3,623,409 | 11/1971 | Uno et al. .......................... | 354/50 |
| 3,670,635 | 6/1972 | Ort ........................................ | 354/50 |
| 3,731,601 | 5/1973 | Matsuzaki ............................ | 354/34 |
| 3,829,877 | 8/1974 | Kitai ..................................... | 354/258 |
| 3,833,915 | 9/1974 | Tanaka et al. ...................... | 354/50 |
| 3,893,143 | 7/1975 | Taguchi et al. .................... | 354/258 |
| 3,922,693 | 11/1975 | Matsui ................................ | 354/234 |

Primary Examiner—Russell E. Adams
Attorney, Agent, or Firm—Cushman, Darby & Cushman

[57] ABSTRACT

A mechanical exposure controlling means for electric shutters comprising a front blade actuating lever, a rear blade actuating lever, and a mechanical exposure controlling lever and bulb controlling lever which can be brought to a position in which they are engageable with the rear blade actuating lever so that, when said mechanical exposure controlling is brought to the position in which it is engageable with the rear blade actuating lever, an exposure may be made only at a specific shutter speed and, when said bulb controlling lever is brought to the position in which it is engageable with the rear blade actuating lever, a bulb exposure may be made. When the mechanical exposure controlling lever and bulb controlling lever are brought to the position in which they can be engaged with the rear blade actuating lever, the exposure time controlling circuit will be cut off from the current source battery.

4 Claims, 3 Drawing Figures

MECHANICAL EXPOSURE CONTROL MEANS FOR ELECTRIC SHUTTERS

BACKGROUND OF THE INVENTION a. Field of the Invention

This invention relates to blade opening and closing mechanisms for electric shutters and more particularly to a mechanical exposure controlling means for electric shutters wherein, in case an electromagnet for controlling the shutter closing time does not work properly due to the drop of the voltage of the current source battery to be below a predetermined value or to a failure of the exposure controlling circuit, by a manual switching operation, an exposure will be made at a specific shutter speed determined in the design or a bulb exposure will be made.

b. Description of the Prior Art

In an electric shutter, in case an electromagnet for controlling the shutter closing time is not energized well or at all due to the drop of the voltage of the current source battery to be below a predetermined level or to a failure of the circuit, the exposure time to be controlled will naturally become improper but, depending on the kind of the shutter, in such case, the rear blade actuating member will start the motion prior to the front blade actuating member and no actual exposure will be made at all.

Therefore, there has been already proposed an electric shutter wherein, by taking the above described point into consideration, an exposing operation can be made at a specific shutter speed by a mechanical controlling means independently of the proper exposure. However, in this kind of conventional means, there have been such defects as are mentioned in the following. That is to say, a conventional product is an electric shutter comprising an armature lever to which a force separating from an electromagnet is given, a rear blade locking lever to be pushed and moved in the course of the separating motion of said lever and a rear blade actuating member to be engaged with said locking lever, wherein a mechanical exposure controlling member is brought into the motion range of the armature lever so that said armature lever may be once engaged with said mechanical exposure controlling member in the motion process before said armature lever pushes and moves said locking lever. Therefore, in some case, due to the fluctuation of the precision of parts, before being engaged with the mechanical exposure controlling member, the armature lever will push and move the rear blade locking lever to immediately operate the rear blade actuating member. Further, the separating force of the armature lever is set to be as weak as possible to reduce the consumption of the battery in the relation with the attraction of the electromagnet. Therefore, the separation force of the armature lever from the position in which the armature lever is once engaged with the mechanical exposure controlling member will become so weak that the armature lever will not be able to push and move the rear blade locking lever in the relation of the balance in the rear blade locking lever and the operation force of the rear blade actuating member and will be no longer able to release the rear blade actuating member in some case.

SUMMARY OF THE INVENTION

Therefore, a primary object of the present invention is to provide a mechanical exposure controlling means for electric shutters wherein, in case an exposure is to be made within a specific exposure time in an electric shutter, a mechanical exposure controlling member will be made to come directly into the motion range of a rear blade actuating member to once stop the motion of the rear blade actuating member so that the rear blade actuating member may be positively engaged and disengaged without being influenced by such fluctuation of the working precision of parts as in the above mentioned conventional product or by the variation of the actuation of each member with the laps of time.

Another object of the present invention is to provide an electric shutter wherein the above mentioned mechanical exposure controlling means is made to be utilizable in the case of flash photographing in order to reduce as much as possible the consumption of the current source battery.

A further object of the present invention is to provide an electric shutter wherein the above mentioned mechanical exposure controlling means is made to be utilizable in the case of bulb photographing.

These and other objects of the present invention will become more apparent during the couse of the following detailed description and appended claims.

DESCRIPTION OF THE PREFERRED EMBODIMENT

Figure 1:
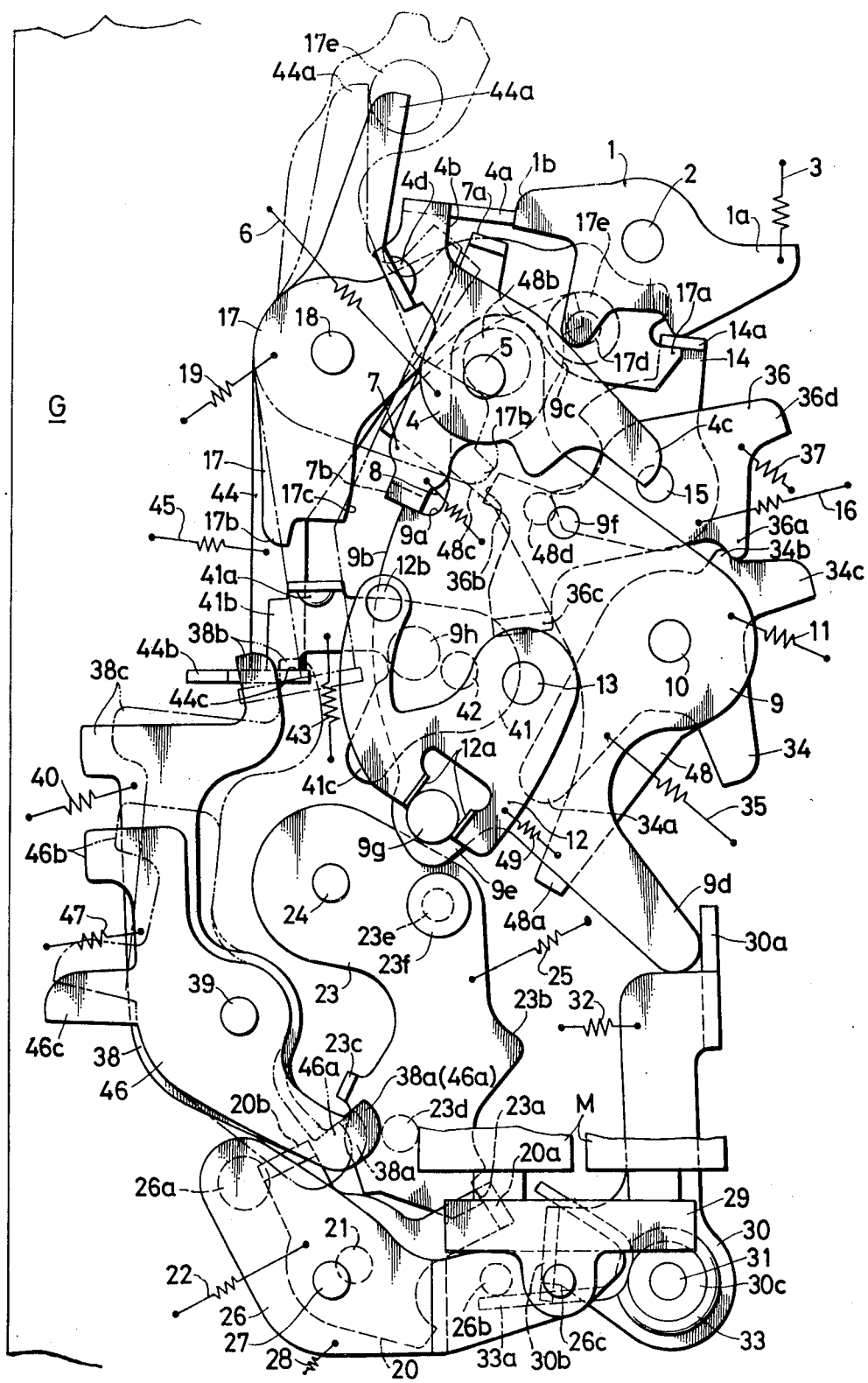
FIG. 1 is a plan view in a cocked state of an embodiment of an opening and closing mechanism part of an electric shutter according to the present invention.

Referring to FIG. 1, reference numeral 1 signifies a first releasing lever which is rotatably mounted on a shaft 2 fixed on a base plate G, is biased counterclockwise by a spring 3 and has an arm 1a and end surface 1b. Numeral 4 signifies a second releasing lever which is rotatably mounted on a shaft 5 fixed on the base plate G, is biased clockwise by a spring 6, forms a bent portion 4a engageable with the end surface 1b of the first releasing lever 1, a side surface 4b and an arm 4c and is provided with an FP-contact 4d. Numeral 7 signifies a shutter releasing lever mounted rotatably on the shaft 5, biased counterclockwise by a spring 8 and forming a bent portion 7a engageable with the side surface 4 of the second releasing lever 4 and another bent portion 7b. Numeral 9 signifies a controlling lever which is rotatably mounted on a shaft 10 fixed on the base plate G, is biased clockwise by a spring 11, forms a hook 9a engageable with the bent portion 7b of the shutter releasing lever 7, an arcuate side surface 9b, a side surface 9c, an arm 9d and a cam surface 9e and is provided as planted with a pin 9f engageable with the arm 4c of the above mentioned second releasing lever 4 and other pins 9g and 9h. Numeral 12 signifies a switch controlling lever which is rotatably mounted on a shaft 13 fixed on a member (not illustrated) integral with the base plate G, forms a bent portion 12a holding the pin 9g of the controlling lever 9 and has a switch operating pin 12b. Numeral 14 signifies a front blade locking lever which is rotatably mounted on a shaft 15 fixed on the base plate G, is biased counterclockwise by a spring 16 and forms a bent portion 14a engageable with the side surface 9c of the controlling lever 9. Numeral 17 signifies a front blade actuating lever which is rotatably mounted on a shaft 18 fixed on the base plate G, is biased counterclockwise by a spring 19, forms a hook 17a engageable with the bent portion 14a of the front blade locking lever 14, an end surface 17b and a cam surface 17c, is provided with a pin 17 as planted and is also provided with a roller 17e. Numeral 20 signifies a rear blade locking lever which is rotatably mounted on a shaft fixed on the base plate G, is biased counterclockwise by a spring 22 and forms a bent portion 20a and a stepped bent portion 20b. Numeral 23 signifies a rear blade actuating member which is rotatably mounted on a shaft 24 fixed on the base plate G, is biased counterclockwise by a spring 25, forms a hook 23a engageable with the bent portion 20a of the rear blade locking lever 20, an end surface 23b and a bent portion 23c, is provided with pins 23d and 23e as planted and is provided with a roller 23f contactable with the cam surface 9e of the controlling lever 9. Numeral 26 signifies an armature lever which is rotatably mounted on a shaft 27 fixed on a member (not illustrated) integral with the base plate G, is biased clockwise by a spring 28, is provided as planted with a pin 26a engaged with the stepped bent portion 20b of the rear blade locking lever 20 and another pin 26b and is also provided with a supporting shaft 26c. Numeral 29 signifies an armature mounted rotatably on the supporting shaft 26c and provided as opposed to an electromagnet M (illustrated) partly in the drawing) fixed on the base plate G. Numeral 30 signifies a holding lever which is rotatably mounted on a shaft 31 fixed on the base plate G, is biased counterclockwise by a weak spring 32, forms a bent portion 30a engaged with the arm 9d of the controlling lever 9 and a stepped bent portion 30b and is provided with a barrel portion 30c. Numeral 33 signifies a holding spring wound around the barrel portion 30c so as to hold the stepped bent portion 30b of the holding lever 30 and engaged at one end 33a of its extension with the pin 26b of the above mentioned armature lever 26. Numeral 34 signifies an interlocking lever mounted rotatably on the shaft 10, biased counterclockwise by a spring 35 and forming an arm 34a engageable with the end surface 23b of the rear blade actuating lever 23, a projected surface 34b and an arm 34c. Numeral 36 signifies a signaling lever mounted rotatably on the shaft 15, biased clockwise by a spring 37 and forming a hook 36a engageable with the projected surface 34b of the interlocking lever 34, a projected surface 36b engageable with the end surface 17b of the front blade actuating lever 17, a bent portion 36c and a signalling arm 36d. Numeral 38 signifies a mechanical exposure controlling lever which is rotatably mounted on a shaft 39 fixed on the base plate G, is biased counterclockwise by a spring 40 and forms a hook 38a engageable with the bent portion 23c of the rear blade actuating lever 23, an arm 38b and a projected portion 38c. Numeral 41 signifies an X-contact lever for an electronic flash device which is rotatably mounted on a shaft 42 fixed on the base plate G, is biased counterclockwise by a spring 43, is provided with an X-contact 41a and forms an arm 41b and an arm 41c engageable with the pin 23e of the rear blade actuating lever 23. Numeral 44 signifies an X-controlling lever for producing an X-synchronization of the electronic flash device mounted rotatably on a shaft 18, biased clockwise by a spring 45 forming an arm 44a engageable with the roller 17e of the front blade actuating lever 17, a stepped bent portion 44b engaged with the arm 38b of the mechanical exposure controlling lever 38 and a side surface 44c engaged with the arm 41b of the X-contact lever 41. Numeral 46 signifies a B (bulb)-controlling lever mounted rotatably on the shaft 39, biased counterclockwise by a spring 47 and forming a hook 46a engageable with the bent portion 23c of the rear blade actuating lever 23, a projected portion 46b and an arm 46c. Numeral 48 signifies a cocking lever mounted rotatably on the shaft 10, biased clockwise by a spring 49, forming an arm 48a, provided with a roller 48b contactable with the cam surface 17c of the front blade actuating lever 17, forming a surface 48c pushing and moving the pin 9h of the controlling lever 9 and further provided as planted with a pin 48d engageable with the bent portion 36c of the signaling lever 36.

The front blade actuating lever 17 and rear blade actuating lever 23 are integrally connected respectively, for example, with a front blade supporting arm and rear blade supporting arm not illustrated. Their particular and concrete structure will be more clearly understood by referring, for example, to Inoue U.S. Patent Application Ser. No. 501,617, filed Aug. 29, 1974, now U.S. Patent No. 4,024,555.

Figure 2:
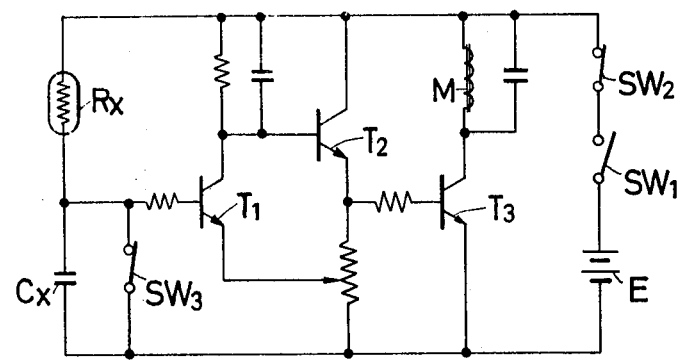
FIG. 2 is a wiring diagram showing a fundamental type of an exposure controlling circuit to be used for the electric shutter shown in FIG. 1.

FIG. 2 shows a fundamental type of exposure controlling circuit to be used together with the shutter blade opening and closing mechanism explained with reference to FIG. 1. In FIG. 2, symbol $R_x$ signifies a photoconductive element which can receive light from an object to be photographed, symbol $C_x$ signifies a capacitor, symbols $T_1$, $T_2$ and $T_3$ signify transistors, symbol E signifies a current source battery, symbol $SW_1$ signifies a normally opened current source switch, symbol $SW_2$ signifies a normally closed auxiliary switch connected in series with the current source switch $SW_1$ and symbol $SW_3$ signifies a normally closed starting switch to be opened by the pin 12b when the switch controlling lever 12 is rotated clockwise from the position in FIG. 1. The electromagnet M is connected with the collector of the transistor $T_3$. Therefore, according to this exposure time controlling circuit, simultaneously with the closure of the current source switch $SW_1$, the electromagnet M will be energized and, when the starting switch $SW_3$ is opened, then the voltage between the terminals of the capacitor $C_x$ charged with the current flowing through the photoconductive element $R_x$ reaches a predetermined level and the transistors $T_1$ and $T_3$ are switched to be cut off, that is to say, when a proper exposure time has elapsed, the electromagnet will be de-energized. As evident from this explanation, when the auxiliary switch $SW_2$ is kept open, even if the current source switch $SW_1$ is closed, the exposure time controlling circuit will not work.

Figure 3:
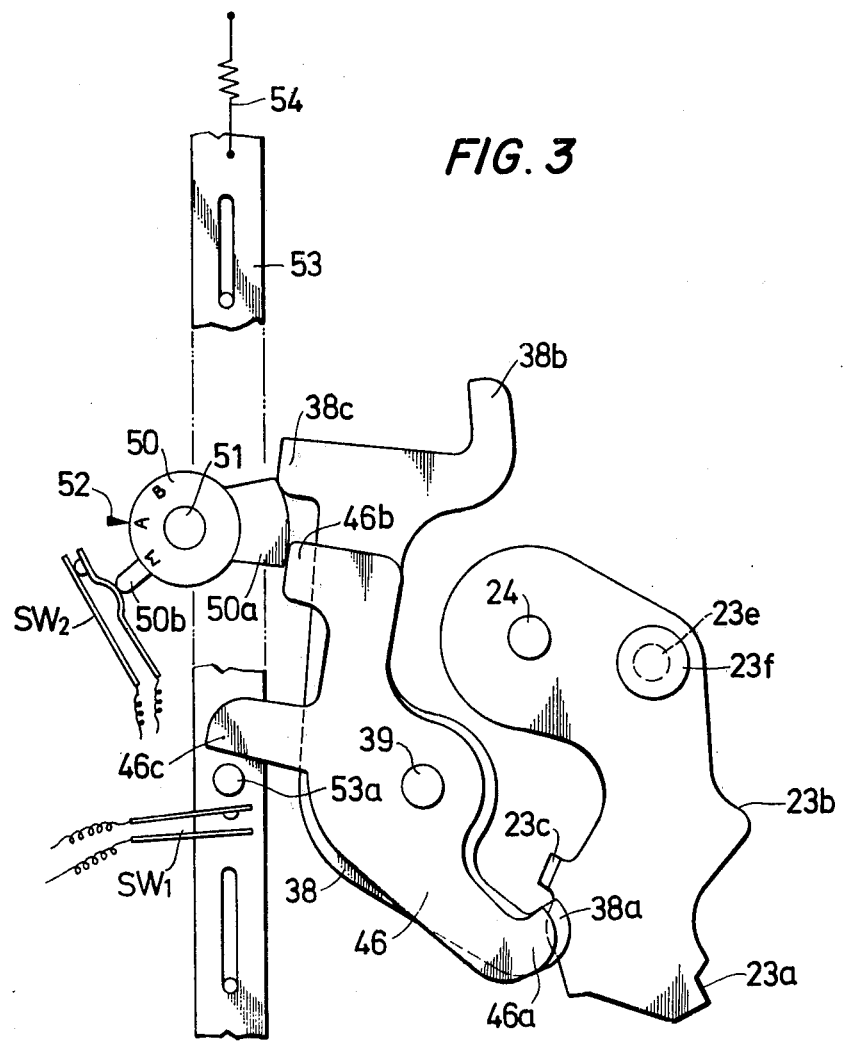
FIG. 3 is a partial plan view of FIG. 1 shwoing a mechanical exposure controlling lever, a bulb controlling lever and their related mechanisms.

FIG. 3 shows particularly a mechanism related with the mechanical exposure controlling lever 38 and B-controlling lever 46 described in FIG. 1. In FIG. 3, numeral 50 signifies a shutter speed dial which is rotatably mounted on a shaft 51 fixed on the base plate G and has a cam portion 50a engageable with the projected portion 38c of the mechanical exposure controlling lever 38 and with the projected portion 46b of the B-controlling lever 46. At least three kinds of marks A, M and B are attached to this speed dial 50 so that when the speed dial 50 is manually rotated, it may be semi-fixedly held by a proper clicking means not illustrated in a position in which any of these marks A, M and B is made to meet a fixed index 52 provided on a member integral with the base plate G. Numeral 53 signifies a shutter releasing member which is slidably mounted on a member integral with the base plate G and has a pin 53a engageable with the arm 46c of the B-controlling lever 46. Numeral 54 signifies a spring biasing the shutter releasing member 53 upward and stronger than the spring 47.

When the dial 50 is rotated until the mark A meets the fixed index 52, the respective controlling levers 38 and 46 will have the projected portions 38c and 46b pushed and moved by the cam portion 50a against the tensions of the respective springs 40 and 47 and will be placed in the position shown in FIG. 3 (in the position of the chain line in FIG. 1). When the mark M is made to meet the fixed index 52, the cam portion 50a will disengage from the projected portion 38c and only the mechanical exposure controlling lever 38 will move to the solid line position from the chain line position in FIG. 1. Further, when the mark B is made to meet the fixed index 52, the cam portion 50a will disengage from the projected portion 46b and only the B-controlling lever 46 will be able to move to the solid line position from the chain line position in FIG. 1. However, in this state, the arm 46c engages with the pin 53a and therefore the counterclockwise rotation of the B-controlling lever 46 is prevented until the shutter releasing member 53 is moved downward against the spring 54.

The current source switch $SW_1$ is so made as to be closed by the pin 53a in the first stage in which the shutter releasing member 53 is moved downward aginst the spring 54. Further, the auxiliary switch $SW_2$ is so made as to be closed only when the mark A is made to meet the fixed index 52 by an electrically insulating projection 50b secured to the shutter speed dial 50.

The operation of the above mentioned means shall be explained in the following.

There shall be explained the operation in the case that, as shown in FIG. 3, the mark A on the speed dial 50 is made to meet the fixed index 52, the mechanical exposure controlling lever 38 and B-controlling lever 46 are placed respectively in the positions in FIG. 3 (in the chain line positions in FIG. 1), the battery voltage in the electric shutter circuit is above the predetermined value and the electromagnet M can positively attract and hold the armature, that is to say, in the case that an automatic exposure control can be made.

In the illustrated cocked state, when the shutter releasing member 53 is pushed downward by the camera releasing operation, first the current source switch $SW_1$ will be closed by the pin 53a so that the exposure time controlling circuit may be in an operating state, the transistors $T_1$ and $T_3$ may be on and the electromagnet M may be energized. Further, as operatively connected with this motion of the shutter releasing member 53, the first releasing lever 1 will be rotated clockwise against the tension of the spring 3. As a result, the end surface 1b will disengage from the bent portion 4a and therefore the second releasing lever 4 will be rotated clockwise by the tension of the spring 6. With this clockwise rotation, the side surface 4b will push and move the bent portion 7a to clockwise rotate the shutter releasing lever 7 against the tension of the spring 8 and to disengage the bent portion 7b from the hook 9a of the controlling lever 9.

Further, the FP-contact 4d will contact an FP-contact lever not illustrated to flash an FP class flash means in case it is fitted.

The disengaged controlling lever 9 will be rotated clockwise by the tension of the spring 11. With this clockwise rotation of the controlling lever 9, first the switch controlling lever 12 will rotate clockwise together with the controlling lever 9, the starting switch $SW_3$ will be opened by the switch operating pin 12b and thereby the counting of the exposure time will be started. On the other hand, with the displacement of the arm 9c with the clockwise rotation of the controlling lever 9, the holding lever 30 will be rotated counterclockwise by the tension of the spring 32 so that the bent portion 30a may follow. Therefore, the holding spring 33 will be displaced integrally with the holding lever 30 while holding the stepped bent part 30b so that the pressing of the pin 26b of the armature lever 26 by one end 33a may be released. As a result, the armature lever 26 will be able to be rotated counterclockwise by the tension of the spring 28 but the armature will be attracted and held by the energized electromagnet M and therefore the armature lever 26 will remain as illustrated.

Further, after a predetermined clockwisse rotation of the controlling lever 9, the surface 9c will push and move the bent portion 14a to clockwise rotate the front blade locking lever 14 against the tension of the spring 16 and to disengage the bent portion 14a from the hook 17a of the front blade actuating lever 17. Therefore, the front blade actuating lever 17 will be rotated counterclockwise to the chain line position in FIG. 1 by the tension of the spring 19, the front blades not illustrated will be opened and the end surface 17b will come into the motion range of the projected surface 36b of the signaling lever 36. On the other hand, the X-controlling lever 44 will be rotated counterclockwise against the tension of the spring 45 by the roller 17e to disengage the arm 41b of the X-contact lever 41 from the side surface 44c. Therefore, the X-contact lever 41 will be rotated counterclockwise by the tension of the spring 43 of the X-contact lever 41 so that the X-contact may contact an X-contact lever not illustrated, the X-class flash means may be flashed in case it is fitted and the arm 41c may come into the motion range of the roller 23f of the rear blade actuating lever 23. Further, the arm 4c will be pushed and moved by the pin 9f against the tension of the spring 6 so that the second releasing lever 4 may be rotated counterclockwise and the FP-contact 4d may separate from the FP-contact lever and may be returned to a position somewhat counterclockwise rotated from the illustrated state.

After a predetermined time, when the transistors $T_1$ and $T_3$ become off and the electromagnet M is de-energized, the armature lever 26 will be rotated clockwise by the tension of the spring 28, the stepped bent portion 20b will be pushed and moved by the pin 26a so that the rear blade locking lever 20 may be rotated clockwise against the tension of the spring 22 and the bent portion 20a may be disengaged from the hook 23a of the rear blade actuating lever 23. Therefore, the rear blade actuating lever 23 will be rotated counterclockwise by the tension of the spring 25 to close the rear blades not illustrated.

Further, the arm 41c will be pushed and moved by the pin 23e against the tension of the spring 43 by the counterclockwise rotation of the rear blade actuating lever so that the X-contact lever 41 may be rotated clockwise and may be returned to a position somewhat counterclockwise rotated from the illustrated position when the X-contact 41a separates from the X-contact lever.

The arm 34a will be pushed and moved by the surface 23b against the tension of the spring 35 in the final stroke of the counterclockwise rotation of the rear blade actuating lever 23 so that the interlocking lever 34 may be rotated clockwise and, with its clockwise rotation, the first releasing lever 1 may be returned to the illustrated position through such additional means as an interlocking mechanism not illustrated by the arm 34c.

Further, the projected surface 34b will disengaged from the hook 36a by the counterclockwise rotation of the interlocking lever 34 and, therefore, the signaling lever 36 will be rotated clockwise by the tension of the spring 37 but the projected surface 36b will contact the end surface 17b of the front blade actuating lever 17 to immediately stop the clockwise rotation. Therefore, in such case, the signaling lever 36 will be little displaced.

In the following, there shall be explained such case that, due to the drop of the voltage of the current source battery E to be below the predetermined value or a failure in the circuit, even if the current source switch $SW_1$ is closed, the electromagnet M will not be energized well of at all and will not be able to attract and hold the armature 29.

In such case, as described above, in the clockwise rotation of the controlling lever 9, before the front blade locking lever 14 is disengaged from the front blade actuating lever 17, the pressing of the pin 26a will be released by the displacement of the holding spring 33 with the counterclockwise rotation of the holding lever 30 and therefore the armature lever 26 will be immediately rotated clockwise by the tension of the spring 28 to disengage the rear blade locking lever 20 from the rear blade actuating lever 23. Therefore, the rear blade actuating lever 23 will rotate counterclockwise before the front blade actuating lever 17 rotates.

As a result, as the end surface 17b of the front blade actuating lever 17 has not yet come into the motion range of the projected surface 36b, the signaling lever 36 will be sufficiently clockwise rotated by the tension of the spring 37.

Thereafter the front blade actuating lever 17 will be also disengaged and will rotate counterclockwise.

Further, by the motion of the arm 36d with the sufficient clockwise rotation of this signaling lever 36, for example, a flag is made to appear in the view finder to indicate that the photographing operation was not proper due to some failure.

By the way, in this operation, as the rear blade actuating lever 23 operates before the front blade actuating lever 17 operates, the rear blades will be closed before the front blades are opened and the film will not be exposed. Therefore, by utilizing the sufficient clockwise rotation of the above mentioned signaling lever 36, the film winding mechanism can be temporarily disengaged so that the film winding to be made with the later described cocking operation of the shutter may be idle.

The cocking operation of the shutter mechanism shall be explained in the following.

When the winding lever of the camera not illustrated is operated, the arm 48a will be pushed and moved so that the cocking lever 48 may be rotated counterclockwise against the tension of the spring 49. With this counterclockwise rotation, first the cam surface 17c will be pushed and moved by the roller 48b so that the front blade actuating lever 17 may be rotated clockwise against the tension of the spring 19, the front blades not illustrated may be closed and finally the hook 17a may be engaged with the bent portion 14a of the front blade locking lever 14. On the other hand, a little later, the bent portion 36c will be pushed and moved by the pin 48d so that the signaling lever 36 may be rotated counterclockwise against the tension of the spring 37 and at the same time the pin 9h will be pushed and moved by the surface 48c so that the controlling lever 9 may be rotated counterclockwise against the tension of the spring 11 and the hook 9a may be engaged with the bent portion 7b of the shutter releasing lever 7.

With the displacement of the roller 17e with the clockwise rotation of the front blade actuating lever 17, the X-controlling lever 44 will be rotated clockwise by the tension of the spring 45 to return to the illustrated position so that the side surface 44c may be engageable with the arm 41b of the X-contact lever 41.

With the counterclockwise rotation of the controlling lever 9, first the surface 9c will retreat from the bent portion 14a so that the counterclockwise rotation of the front blade locking lever 14 may be possible and the above described front blade actuating lever 17 may be positively engaged. Further, the roller 23f will be pushed and moved by the cam surface 9e against the tension of the spring 25 so that the rear blade actuating lever 23 may be rotated clockwise and the hook 23a may be engaged with the bent portion 20a of the rear blade locking lever 20.

On the other hand, with the counterclockwise rotation of the controlling lever 9, the bent portion 30a will be pushed and moved by the arm 9d against the tension of the spring 32 so that the holding lever 30 may be rotated clockwise. Therefore, the pin 26b will be pushed and moved by one end 33a of the holding spring 33 displaced integrally with the holding lever 30 against the tension of the spring 28 so that the armature lever 26 may be rotated counterclockwise and the armature 29 may be pressed into contact with the electromagnet M.

By the way, this counterclockwise rotation of the armature lever 26 will be made earlier than the engaging time of the above described rear blade actuating lever 23 an, in such case, the pin 26a will retreat from the bent portion 20b so that the rear blade locking lever 20 may be already rotated counterclockwise and may be positively engaged.

The second releasing lever 4 will rotate clockwise until the bent portion 4a is engaged with the end surface 1b of the first releasing lever 1 by the tension of the spring 6 with the displacement of the pin 9f with the counterclockwise rotation of the controlling lever 9.

Further, the pressing of the arm 34a by the surface 23b will be released by the clockwise rotation of the rear blade actuating lever 23 so that the interlocking lever 34 may be rotated counterclockwise by the tension of the spring 35 and the projected surface 34b may engage with the hook 36a of the signaling lever 36.

After the above cocking operation is made, when the operation is released and the winding lever of the camera is returned, the pressing of the arm 48a will be released so that the cocking lever 48 may be rotated clockwise to return by the tension of the spring 49.

Thus all the members will be set as illustrated.

As described above, in case the voltage of the current source battery E drops to be below a predetermined level or the circuit fails, even if the releasing button of the camera is pushed, the film will not be exposed. This fact is made known to the photographer by the operation of the signaling lever 36. This failure can be remedied by making the mark M on the shutter speed dial 50 meet the fixed index 52.

That is to say, when the mark M on the shutter speed dial 50 is made to meet the fixed index 52, the projected portion 38c will be disengaged from the cam portion 50a so that the mechanical exposure controlling lever 38 may be rotated counterclockwise to be displaced from the chain line position to the solid line position in FIG. 1, the hook 38a will cone into the motion range of the bent portion 23c of the rear blade actuating lever 23, the arm 38b will come into the motion range of the stepped bent portion 44b of the X-controlling lever 44, the auxiliary switch SW$_2$ will be opened by the movement of the projection 50b and the exposure time controlling circuit will be cut off the current source battery E.

The process after the releasing button of the camera is pushed and just before the rear blade actuating lever 23 is rotated counterclockwise is the same as the operating process when the electromagnet M is not energized. But, in this case, the counterclockwise rotation of the rear blade actuating lever 23 will be stopped by the engagement of the bent portion 23c with the hook 38a of the mechanical exposure controlling lever 38.

As already explained when th X-controlling lever 44 is rotated counterclockwise, the arm 38b will be pushed and moved by the stepped bent portion 44b against the tension of the spring 40 so that the mechanical exposure controlling lever 38 may be rotated clockwise and the hook 38a may be disengaged from the bent portion 23c. As a result, the rear blade actuating lever 23 will rotate counterclockwise to close the rear blades.

As evident from the above explanation, in this case, the exposure time will be a predetermined time selected in the design, the X-controlling lever 44 will be controlled in the final stage of the counterclockwise rotation of the front blade actuating lever 17, then the mechanical exposure controlling lever 38 and rear blade actuating lever 23 will be controlled in the order mentioned and therefore the shutter blades will be closed always through the fully opened state. Therefore, in this case, too, the flash photographing will be possible.

The exposing operation for the bulb photographing shall be briefly explained in the following.

First of all, when the mark B on the shutter speed dial 50 is made to meet the fixed index 52, the projected portion 46will be disengaged so that the B-controlling lever 46 may be rotated counterclockwise by the tension of the spring 47 and, in the same manner as in the above mentioned case, the auxiliary switch SW$_2$ may be opened. In this case, the arm 46c will contact the pin 53a and therefore, the B-controlling lever 46 will be rotated counterclockwise from the chain line position to the solid line position in FIG. 1 by the spring 47 as soon as the shutter releasing member 53 is pushed downward and will be again rotated clockwise to the chain line position as soon as the shutter releasing member 53 returns upward. Therefore, as a result, the operation of the rear blade actuating lever 23 will be prevented by the B-controlling lever 46 only while the shutter releasing member 53 is kept pushed downward. Therefore, only while the releasing member 53 is pushed, the shutter will be kept open but, when the B-controlling lever 46 is rotated clockwise from the solid line position to the chain line position to the chain line position in FIG. 1 by the return of the releasing member 53, the rear blade actuating lever 23 will resume the counterclockwise rotation to close the rear blades.

We claim:

1. A mechanical exposure control means for electric shutters comprising:
    a base plate,
    a front blade actuating member supported rotatably on said base plate and movable between its released position and cocked position, rear blade actuating member supported rotatably on said base plate and movable between its released position and cocked position,
    a mechanical exposure controlling member supported rotatably on said base plate and capable of locking said rear blade actuating member in its cocked position by directly engaging with said rear blade actuating member and capable of being moved by said front blade actuating member in order to release said rear blade actuating member,
    an exposure time controlling circuit including an RC delay circuit and an electromagnet therein and capable of electrically controlling the operation time of said rear blade actuating member through said electromagnet,
    a shutter speed dial supported rotatably on said base plate and capable of bringing said mechanical exposure controlling member into engagement with said rear blade actuating member, and
    an auxiliary switch arranged adjacently to said shutter speed dial and capable of being operated by said shutter speed dial to make said exposure time controlling circuit inoperative when said rear blade actuating member is brought into engagement with said mechanical exposure controlling member.

2. A mechanical exposure control means according to claim 1 wherein said mechanical exposure controlling means further comprises a bulb controlling member supported rotatably on said base plate and engageable with said shutter speed dial and rear blade actuating member, said auxiliary switch being opened and said rear blade actuating member being locked in the cocked position by said bulb controlling member during the shutter release operation when said bulb controlling member is made engageable with said rear blade actuating member by said shutter speed dial.

3. A mechanical exposure control means according to claim 1 wherein said mechanical exposure controlling means further comprises an X-contact lever for an electronic flash device supported rotatably on said base plate, and an X-controlling member for producing an X-synchronization of said electronic flash device rotatably supported on said base plate and engageable with said front blade actuating member and X-contact lever, said X-contact lever being moved to flash an X-class flash means when said X-controlling member is moved by said front blade actuating member.

4. A mechanical exposure control means for electric shutters comprising
    a base plate,
    a front blade actuating member supported rotatably on said base plate and movable between its released position and cocked position,
    a front blade locking member supported rotatably on said base plate and capable of locking said front blade actuating member in its cocked position,
    a shutter releasing lever supported rotatably on said base plate and engageable with said front blade actuating member to release said front blade actuating member,
    a holding lever supported rotatably on said base plate and engaged with said shutter releasing lever,
    an armature lever supported rotatably on said base plate and operatively connected with said holding lever, a rear blade locking member supported rotatably on said base plate and engaged with said armature lever, a rear blade actuating member supported rotatably on said base plate and capable of being locked in its cocked position by said rear blade member, a bulb controlling member supported rotatably on said base plate and capable of locking said rear blade actuating member in its cocked position, a shutter speed dial supported rotatably on said base plate and capable of bringing said bulb controlling member into engagement with said rear blade actuating member, a shutter releasing member arranged adjacently to said bulb controlling member and engageable with said bulb controlling member, and an auxiliary switch arranged adjacently to said shutter speed dial and capable of being opened by said shutter speed dial to make an exposure time controlling circuit inoperative when said rear blade actuating member is brought into engagement with said bulb controlling member, said rear blade actuating member being locked in the cocked position by said bulb controlling member during the operation of said shutter releasing member when said bulb controlling member is made engageable with said rear blade actuating member by said shutter speed dial.

* * * * *